US010095205B2

United States Patent
Lovicott et al.

(10) Patent No.: US 10,095,205 B2
(45) Date of Patent: Oct. 9, 2018

(54) FAN CHARACTERIZATION AND CONTROL SYSTEM

(71) Applicant: Dell Products L.P., Round Rock, TX (US)

(72) Inventors: Dominick Adam Lovicott, Round Rock, TX (US); Shawn Joel Dube, Austin, TX (US); Robert Boyd Curtis, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 15/010,885

(22) Filed: Jan. 29, 2016

(65) Prior Publication Data

US 2017/0219239 A1 Aug. 3, 2017

(51) Int. Cl.
G05D 23/00 (2006.01)
G05B 15/02 (2006.01)
F04D 25/08 (2006.01)
F04D 27/00 (2006.01)

(52) U.S. Cl.
CPC ............ *G05B 15/02* (2013.01); *F04D 25/08* (2013.01); *F04D 27/001* (2013.01); *F05B 2260/80* (2013.01)

(58) Field of Classification Search
CPC ....... G05B 15/02; F04D 25/08; F04D 27/001; F05B 2260/80
USPC ........................................................ 700/300
See application file for complete search history.

(56) References Cited

U.S. PATENT DOCUMENTS

| 9,760,071 B2* | 9/2017 | Bhattacharyya ....... G05B 15/02 |
| 9,829,868 B2* | 11/2017 | Acosta Gonzalez ... F04D 27/00 |
| 9,845,966 B2* | 12/2017 | Son ........................ F24F 11/006 |
| 2015/0369253 A1 | 12/2015 | Ragupathi et al. |
| 2018/0003186 A1* | 1/2018 | Matsuura .............. F04D 27/004 |

OTHER PUBLICATIONS

Dinesh Kunnathur Ragupathi, Hasain Shabbir and Arun Muthaiyan; "System and Method for Optimized Thermal Control for Management Controller Offline;" U.S. Appl. No. 14/702,922, filed May 4, 2015; 23 Pages.

* cited by examiner

*Primary Examiner* — Fernando Hidalgo
(74) *Attorney, Agent, or Firm* — Haynes and Boone, LLP

(57) ABSTRACT

A fan characterization and control system includes a chassis housing a plurality of components and a fan system. A controller system is coupled to the components and the fan system and configured to detect fan devices in the fan system that are connected to the controller system via respective fan connectors. The controller system determines fan performance categories of each of the fan devices based on signals communicated by each of the fan devices through at least one pin on the respective fan connectors. The controller system accesses a fan performance database that stores different fan performance categories and respective fan performance characteristics for each of the different fan performance categories. The controller system uses fan performance information that is associated in the fan performance database with each of the fan performance categories determined for the fan devices to configure the components and the fan system for operation.

20 Claims, 7 Drawing Sheets

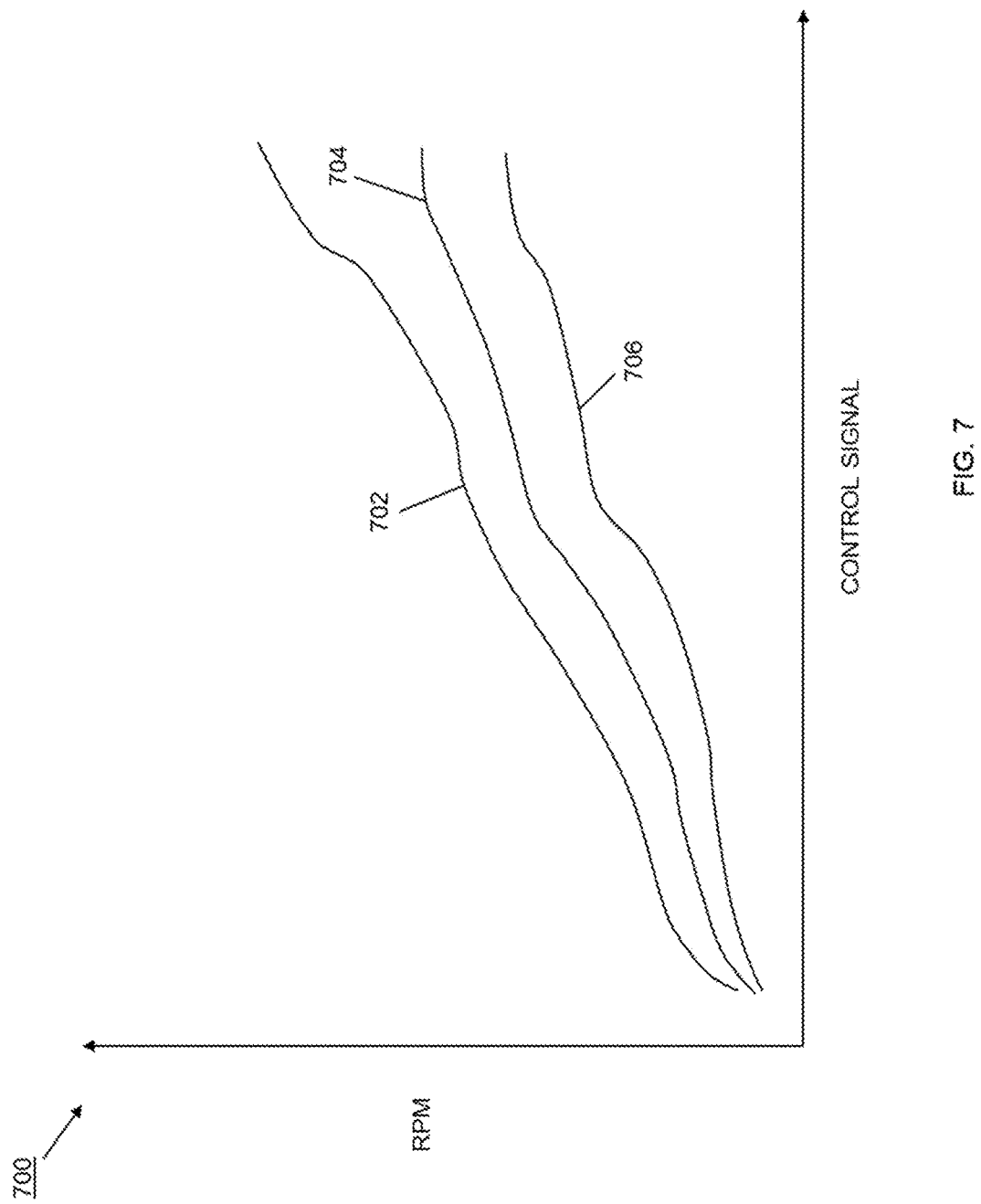

FAN CHARACTERIZATION AND CONTROL SYSTEM

BACKGROUND

The present disclosure relates generally to information handling systems, and more particularly to a system for characterizing and controlling fans in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers, sometimes include a server chassis that houses the components of the server that may include computing components, cooling components, power components, and/or a variety of other components known in the art. In many cases, the server chassis may be configured to utilize fans and fan systems from different vendors for continuity of supply, to provide different cooling capabilities that enable varying levels of performance, and/or to enable other functionality of the server. In order to allow the utilization of different fans and fan systems, a number of fan-specific dependencies must be compensated for that require knowledge of characteristics of the fans and fan systems. Conventionally, such fan characteristics are defined in firmware lookup tables, which require either knowledge of each fan or fan system that may be utilized in the server chassis, either included in the server as manufactured, or updated via firmware updates provided to the server. However, it is impossible to account for future fans or fan systems during manufacture of the server, and it has been found that many users are hesitant to update firmware once the server has been deployed and is operating correctly due to the possibility of introducing new-firmware-related performance issues that can cause server downtime. One solution to this issue is to provide "smart fan" systems that store their fan characteristics and provide those fan characteristics to the system to allow the system to account for different fans. However, such solutions add cost and complexity to the system, and thus are not viable in many instances.

Accordingly, it would be desirable to provide an improved fan characterization and control system.

SUMMARY

According to one embodiment, an Information Handling System (IHS) includes a non-transitory memory system storing a plurality of different fan performance categories and respective fan performance characteristics for each of the plurality of different fan performance categories; and a processing system that is coupled to the non-transitory memory system and that is configured to execute instructions from the non-transitory memory system to provide a system control engine that is configured to: detect a plurality of fan devices that are connected to the processing system via respective fan connectors; determine fan performance categories of each of the plurality of fan devices based on signals communicated by each of the plurality of fan devices through at least one pin on the respective fan connectors; and use fan performance information that is associated in the fan performance database with each of the fan performance categories determined for the plurality of fan devices to configure a plurality of components and the plurality of fan devices for operation.

BRIEF DESCRIPTION OF THE DRAWINGS

FIG. 7 is a graph illustrating an embodiment of a fan performance graph.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
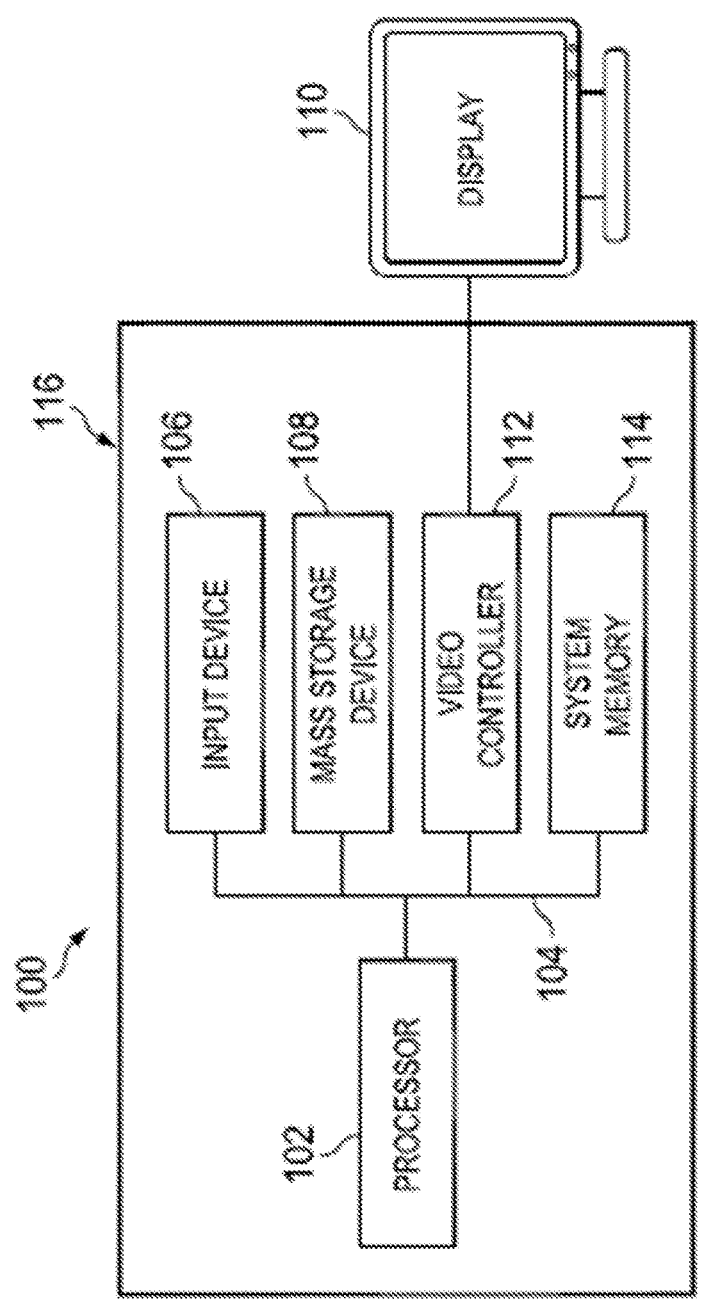
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
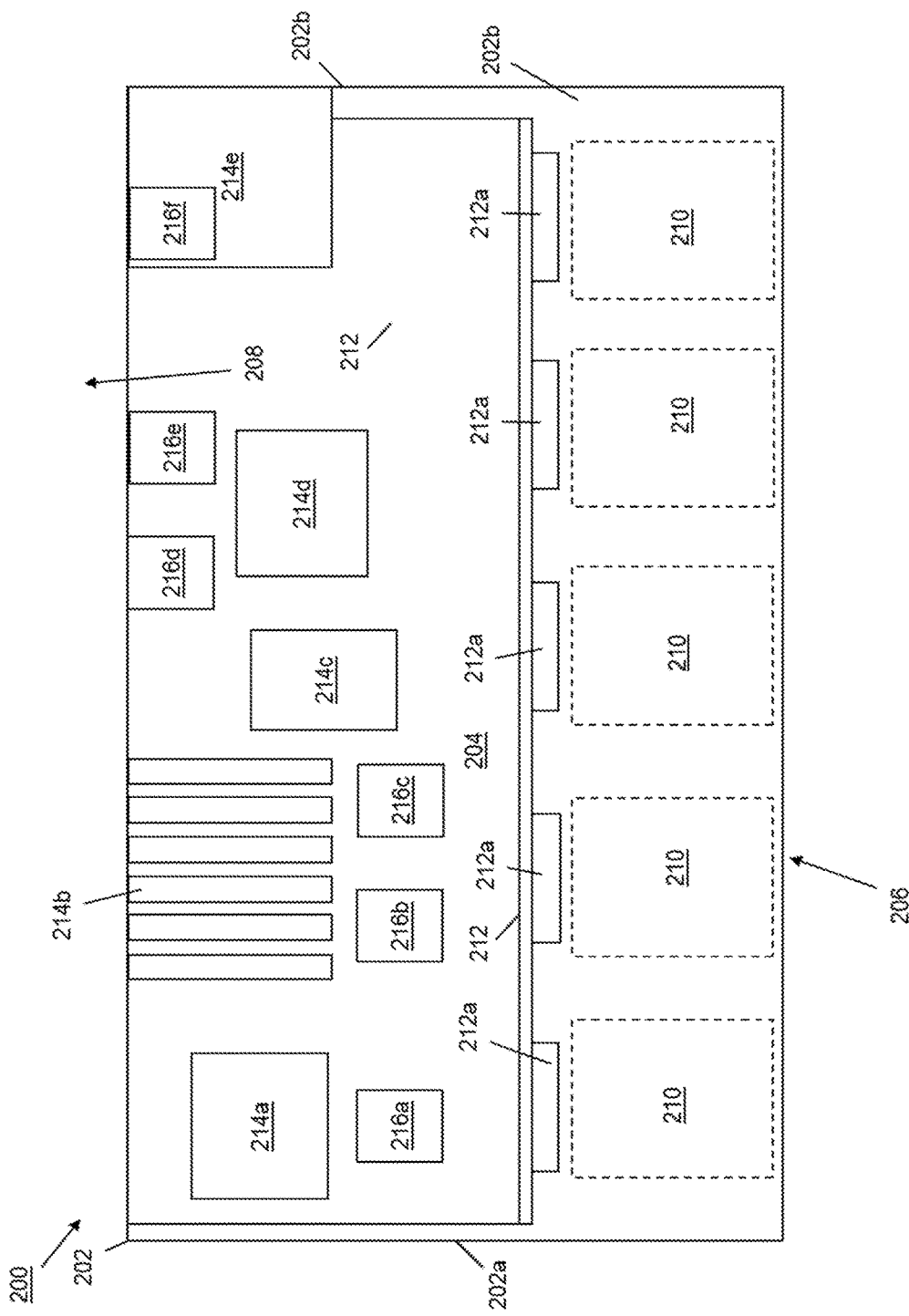
FIG. 2 is a schematic view illustrating an embodiment of a fan characterization and control system.

Referring now to FIG. 2, an embodiment of a fan characterization and control system 200 is illustrated. In an embodiment, the fan characterization and control system 200 may be provided in the IHS 100 discussed above with reference to FIG. 1, and/or may include some of all of the components of the IHS. One of skill in the art in possession of the present disclosure will recognize that, in the specific embodiments described herein, the fan characterization and control system 200 is provided in a server. However, in other embodiments, the fan characterization and control system 200 may be provided in a storage system, a networking system (e.g., a switch, router, access point, etc.), a desktop computing system, a laptop/notebook computing system, and/or any other computing system known in the art that may utilize fan devices as discussed below. The fan characterization and control system 200 includes a chassis 202 that, in the illustrated embodiment, houses components of a server, only some of which are illustrated in FIG. 2. For example, the chassis 202 of FIG. 2 includes a plurality of walls (side walls 202a and 202b are illustrated, but one of skill in the art in possession of the present disclosure will recognize that a top wall, bottom wall, front wall, and/or rear wall may be provided on the chassis 202 as well) that define a chassis enclosure 204 in which the components of the server are located. The chassis 202 may further define a chassis airflow entrance 206 and a chassis airflow exit 208 that allow air to move through the chassis enclosure 204. While a chassis airflow entrance 206 and a chassis airflow exit 208 are illustrated as provided through a front and rear of the chassis 202, airflow entrances defined by the chassis 202 on any portion of the chassis 202 will fall within the scope of the present disclosure.

In the embodiment illustrated in FIG. 2, a plurality of storage component slots 210 are defined in the chassis enclosure 204 adjacent a backplane 212 that includes respective storage drive component connectors 212a located adjacent each of the plurality of storage drive component slots 210. As would be understood by one of skill in the art in possession of the present disclosure, storage drives may be positioned and/or mounted in the storage drive component slots 210 and mated with the storage device component connectors 212a to couple the storage drive components to the backplane 212. A plurality of other system components are located in the chassis enclosure 204 and coupled to the backplane 212. For example, the plurality of system components may include a processing component 214a (e.g., one or more central processing units (CPUs), one or more graphics processing units (GPUs), etc.), a memory component 214b (e.g., one or more memory devices), a network controller component 214c (e.g., one or more network interface controllers (NICs)), one or more card components 214d (e.g., one or more Peripheral Component Interconnect express (PCIe) cards), a power component 214e (e.g., a Power Supply Unit (PSU)), and/or any other computing components known in the art.

A fan system 216 is provided in the chassis enclosure 204 that, in the illustrated embodiment, includes a plurality of fan devices that are positioned throughout the chassis enclosure 204. For example, a fan device 216a is located adjacent the processing component 214a and configured to produce an airflow over that processing component 214a, a plurality of fan devices 216b and 216c are located adjacent the memory component 214b and configured to produce an airflow over that memory component 214b, a plurality of fan devices 216d and 216e are located adjacent the card component 214d and configured to produce an airflow over that card component 214d, and a fan device 216f is located in the power component 214e and configured to produce an airflow through that power component 214e. As discussed above, in many embodiments, the server within which the fan characterization and control system 200 is provided may support a variety of different fan devices 216a-f that may be provided from a variety of different vendors and, as such, may have different fan performance characteristics such as power consumption, fan failure thresholds, airflow delivery capabilities, ambient temperature support limits, and/or other fan performance characteristics known in the art. For example, in experimental embodiments, a POWEREDGE® M1000e Blade Enclosure from DELL® Inc., of Round Rock, Tex., United States was provided with a fan characterization and control system according to the teachings of the present disclosure (e.g., housing server blades that each include some or all of the components illustrated in FIG. 2), and was capable of supporting different generations of fan devices available from NIDEC® Corporation, NMB® Technologies, and other fan vendors known in the art. In such experimental embodiments, it was found that for similar control signals (e.g., Pulse Width Modulation (PWN) control signals), fans from different fan vendors, as well as different generation fans from the same fan vendors, operated at substantially different speeds.

Figure 3:
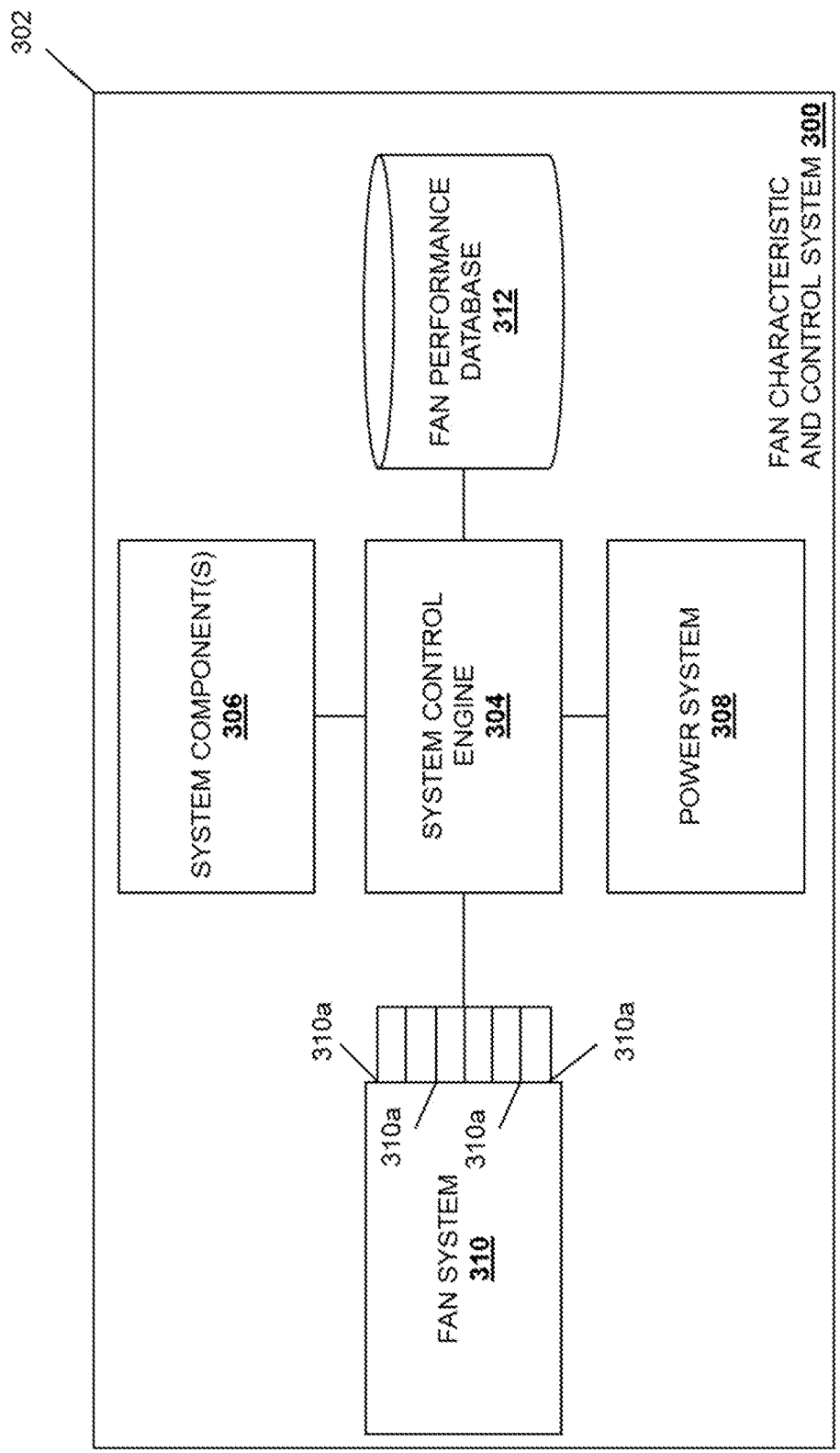
FIG. 3 is a schematic view illustrating an embodiment of the fan characterization and control system of FIG. 2.

Referring now to FIG. 3, an embodiment of a fan characterization and control system 300 is illustrated that may be the fan characterization and control system 200 discussed above with reference to FIG. 2. As such, the fan characterization and control system 300 may be provided in the IHS 100 discussed above and/or may include some or all of the components of the IHS 100. The fan characterization and control system 300 includes a chassis 302 that houses the components of the fan characterization and control system 300, only some of which are illustrated in FIG. 3. For example, the chassis 302 may house a processing system (not illustrated, but which may include the processor 102 discussed above with reference to FIG. 1, and/or the processing component 214a discussed above with reference to FIG. 2) and a memory system (not illustrated, but which may include the system memory 114 discussed above with reference to FIG. 1, and/or the memory component 214b discussed above with reference to FIG. 2) that includes instructions that, when executed by the processing system, causes the processing system to provide a system control engine 304 that is configured to perform the functions of the system control engines and fan characterization and control systems discussed below. In a specific embodiment, the system control engine 304 may be provided by a Baseboard Management Controller (BMC), although other subsystems may be utilized to provide the system control engine 304 while remaining within the scope of the present disclosure.

The chassis 302 also houses one or more system components 306 (e.g., the components 214a-214e discussed above with reference to FIG. 2) that are coupled to the system control engine 304 (e.g., via couplings between each of the system components and the processing system), a fan system 310 (e.g., provided by the fan devices 216a-216f discussed above with reference to FIG. 2) that is coupled to the system control engine 304 (e.g., via one or more couplings between the fan devices and the processing system that may include a plurality of connectors 310a that may connect to respective connectors on respective fan devices, discussed in further detail below), and a power system (e.g., the power component 214e discussed above with reference to FIG. 2) that is coupled to the system control engine 304 (e.g., via a coupling between the power system and the processing system. The chassis 302 may also house a storage system (e.g., the storage device 108 discussed above with reference to FIG. 1) that includes a fan performance database 312 that, as discussed in further detail below, may include one or more first predefined fan performance lookup tables that include fan performance characteristics and fan control information for known fan devices from particular fan vendors, as well as one or more second predefined fan performance lookup tables that include fan control information for unknown fan devices (e.g., fan devices for which information is not included in the first predefined lookup table or for which performance characteristic and control information is otherwise not available), as well as the ability to store fan performance characteristics for unknown fan devices as discussed in further detail below. In a specific embodiment, the fan performance database 312 may be provided in and/or accessible to a BMC that provides the system control engine 304. As would be understood by one of skill in the art, fan vendors may produce the first predefined fan control lookup table(s) that include fan performance characteristics and fan control information for their fan devices, and those first predefined fan control lookup tables may be used to optimize the operation of those fan devices. Thus, the first predefined fan control lookup table will not be discussed in detail below other than with regard to their use in operating known fan devices that are provided in the fan characterization and control systems described herein. However, as discussed below, the second predefined fan control lookup table may be created with fan performance characteristics and/or fan control information for unknown fan devices, and used to operate unknown fan devices.

Figure 4:
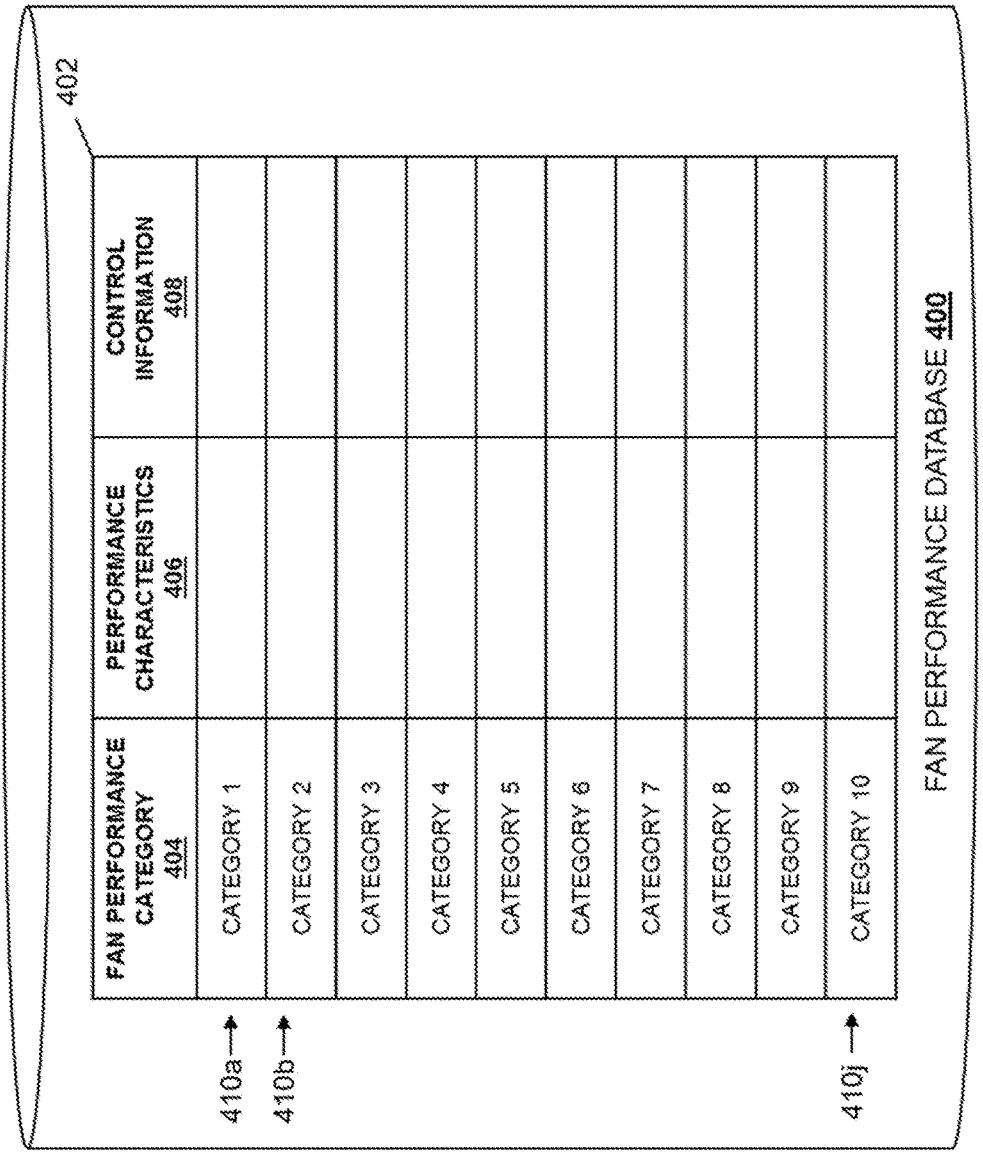
FIG. 4 is a schematic view illustrating an embodiment of a fan performance database used in the fan characterization and control system of FIG. 3.

Referring now to FIG. 4, an embodiment of a fan performance database 400 is illustrated that may be the fan performance database 312 discussed above with reference to FIG. 3. FIG. 4 illustrates an example of a second predefined fan control lookup table 402 that may include either or both of fan control information and fan performance characteristics for unknown fan devices. In the illustrated embodiment, the second predefined lookup table 402 includes a fan performance category column 404, a performance characteristics column 406, and a control information column 408, with each row 410a, 410b, and up to 410j of the second predefined lookup table 402 capable of associating a respective discrete fan performance category in the fan performance category column 404 with respective discrete performance characteristics in the performance characteristics column 406, and respective discrete control information in the control information column 408.

In one embodiment, fan performance categories may be defined by a fan characterization and control system provider and associated with either or both of fan performance characteristics and fan control information. For example, a first category of fan performance (e.g., "CATEGORY 1") may be defined in row 410a of the second predefined fan control lookup table 402 (i.e., in the fan performance category column 404), and associated with fan control information (i.e., in the control information column 408) such as PWM control signals that are configured to drive fan devices that fall in the defined first category of fan performance to produce a variety of different predefined airflows, levels of cooling, cooling capabilities, and/or other fan characteristics known in the art. Similarly, a second category of fan performance (e.g., "CATEGORY 2") may be defined in row 410b of the second predefined fan control lookup table 402 (i.e., in the fan performance category column 404), and associated with fan control information (i.e., in the control information column 408) such as PWM control signals that are configured to drive fan devices that fall in the defined second category of fan performance to produce a variety of predefined airflows, levels of cooling, cooling capabilities, and/or other fan characteristics known in the art. One of skill in the art in possession of the present disclosure will recognize that any number of fan performance categories (e.g., up to "CATEGORY 10" in row 410j in the illustrated embodiment, and more or fewer in unillustrated embodiments) may be similarly defined and associated with similar fan control information in order to define a plurality of different fan performance categories with associated fan control information (e.g., PWM control signals) that is configured to drive different types, models, or generations of fan devices that fall in the different defined categories of fan performance to produce predefined and desired airflows, levels of cooling, cooling capabilities, and/or other fan characteristic known in the art.

In another example, a first category of fan performance (e.g., "CATEGORY 1") may be defined in row 410a of the second predefined fan control lookup table 402 (i.e., in the fan performance category column 404), and associated with fan performance characteristics (i.e., in the performance characteristics column 406) such as estimated volumetric airflow levels (e.g., the Cubic Feet per Minute (CFM) cooling levels discussed below, although other volumetric airflow levels will fall within the scope of the present disclosure) that are desired to be produced by fan devices that fall in the defined first category of fan performance, along with associated control information (i.e., in the control information column 408) for providing that estimated volumetric airflow levels. Similarly, second category of fan performance (e.g., "CATEGORY 2") may be defined in row 410b of the second predefined fan control lookup table 402 (i.e., in the fan performance category column 404), and associated with fan performance characteristics (i.e., in the performance characteristics column 406) such as estimated volumetric airflow levels that are desired to be produced by fan devices that fall in the defined second category of fan performance, along with associated control information (i.e., in the control information column 408) for providing that estimated volumetric airflow levels. One of skill in the art in possession of the present disclosure will recognize that any number of fan performance categories (e.g., up to "CAT- EGORY 10" in row 410*j* in the illustrated embodiment, and more or fewer in unillustrated embodiments) may be similarly defined and associated with similar fan performance characteristics in order to define a plurality of different fan performance categories with associated fan performance characteristics (e.g., estimated volumetric airflow levels) that are desired to be produced from different types, models, or generations of fan devices that fall in the different defined categories of fan performance. As discussed below, fan performance characteristics (e.g., volumetric airflow levels) may be used in the fan characteristic and control system 300 to determine how to control fan devices in the fan system, or fan control information (e.g., an control information offset from a baseline) may be used to control fan devices in the fan system.

While specific examples of fan control information and fan performance information have been provided above, one of skill in the art in possession of the present disclosure will recognize that other types of control information (e.g., different types of control signals) and performance information (e.g., fan failure thresholds, power consumption levels, acoustic performance, etc.) may be associated with the defined fan performance categories while remaining within the scope of the present disclosure. Furthermore, one of skill in the art in possession of the present disclosure will recognize that instead of defining respective discrete fan performance categories with respective discrete fan performance characteristics and respective discrete fan control information, continuous curves that associate fan performance categories with fan performance characteristics and fan control information may be defined by the fan characteristic and control system provider and utilized similarly as discussed below for the second predefined fan control lookup table 402. One of skill in the art in possession of the present disclosure will recognize that such continuous curves may allow for more granularity in the characterization and control of fans according to the teachings of the present disclosure.

Figure 5:
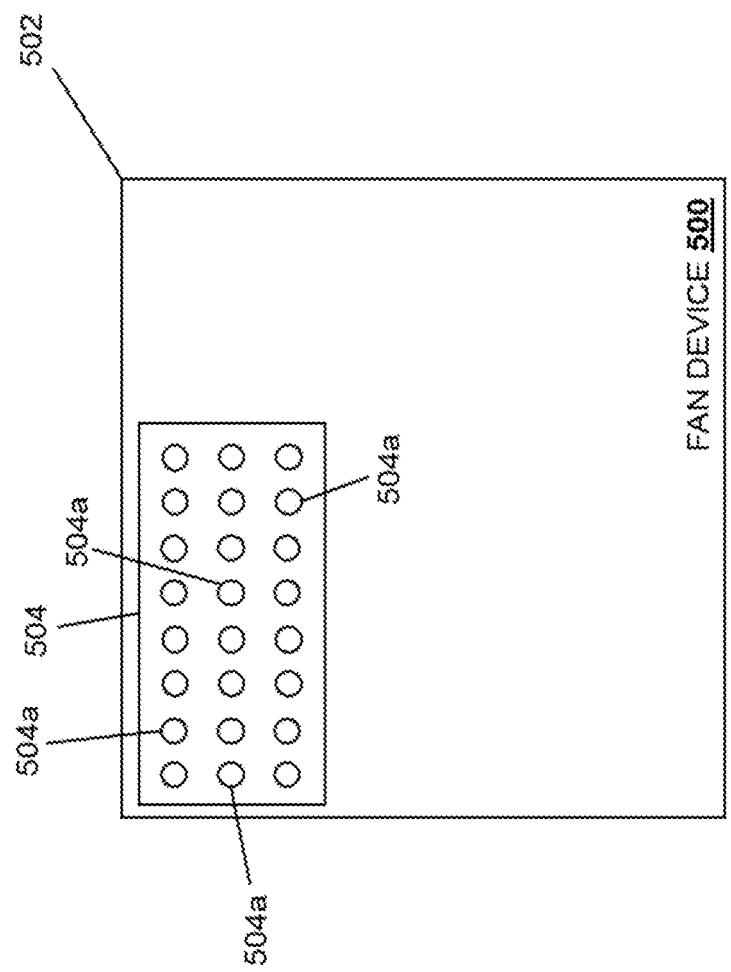
FIG. 5 is a schematic view illustrating an embodiment of a fan device used in the fan characterization and control system of FIGS. 2 and 3.

Referring now to FIG. 5, an embodiment of a fan device 500 is illustrated. While the term "fan device" is utilized throughout the present disclosure, the fan devices described herein may be provided by any of a variety of air moving devices such as blowers, air jets, and/or any other air moving device known in the art. As such, the fan devices described herein may be replaced by or otherwise include any of a variety of air moving devices known in the art. The fan device 500 includes a fan device chassis 502 that houses the components of the fan device 500 that may include fan blades, fan motors, fan controllers, and/or any of the fan components known in the art. A fan connector 504 is located on the surface of the fan chassis 502 and includes a plurality of pins 504*a* and may connect to a fan connector (e.g., the connectors 310*a* discussed above with reference to FIG. 3) to couple the fan device 500 to the fan characterization and control system 200/300 discussed above. In an embodiment, at least one of the pins 504*a* may be configured to identify, when coupled to the fan characterization and control system 200/300, one of the predefined fan performance categories in one of the second predefined fan control lookup tables discussed above. For example, the fan device 500 may include resistor(s) coupled to one or more of the pins 504*a* that may provide a resistor value, when coupled to the fan characterization and control system 200/300, that is associated with one of the fan performance categories in the second predefined fan control lookup table 402. In another example, the fan device 500 may be configured to provide a predefined voltage, through one or more of the pins 504*a* when coupled to the fan characterization and control system 200/300, that is associated with one of the fan performance categories in the second predefined fan control lookup table 402.

While a few specific examples of subsystems for identifying to the fan characterization and control system 200/300 which of the fan performance categories in the second predefined fan control lookup table 402 that the fan device 500 falls into, one of skill in the art in possession of the present disclosure will recognize that any of a variety of techniques may be utilized to provide an identification to the fan characterization and control system 200/300 that has been associated with a fan performance category while remaining within the scope of the present disclosure. Furthermore, as discussed below, one of skill in the art in possession of the present disclosure will recognize that predefined fan control lookup tables may be created as discussed above for any unknown fan devices by defining different fan performance categories that provide a plurality of different predefined fan performance characteristics. Fan devices may then be designed and manufactured that provide any of a variety of fan performance characteristics, and device system provider that incorporates the fan devices into their system may determine which fan performance category a particular fan device falls into (e.g., based on the fan devices in-system performance) and configure that fan device to identify itself to the fan characterization and control system 200/300 as falling within that particular fan performance category. As such, the second predefined fan control lookup tables may be created for existing fan devices as well as future fan devices, and fan device providers simply must determine how their fan devices perform, and configure those fan devices to identify themselves as falling within any of the predefined fan performance categories that include that level of performance.

Figure 6:
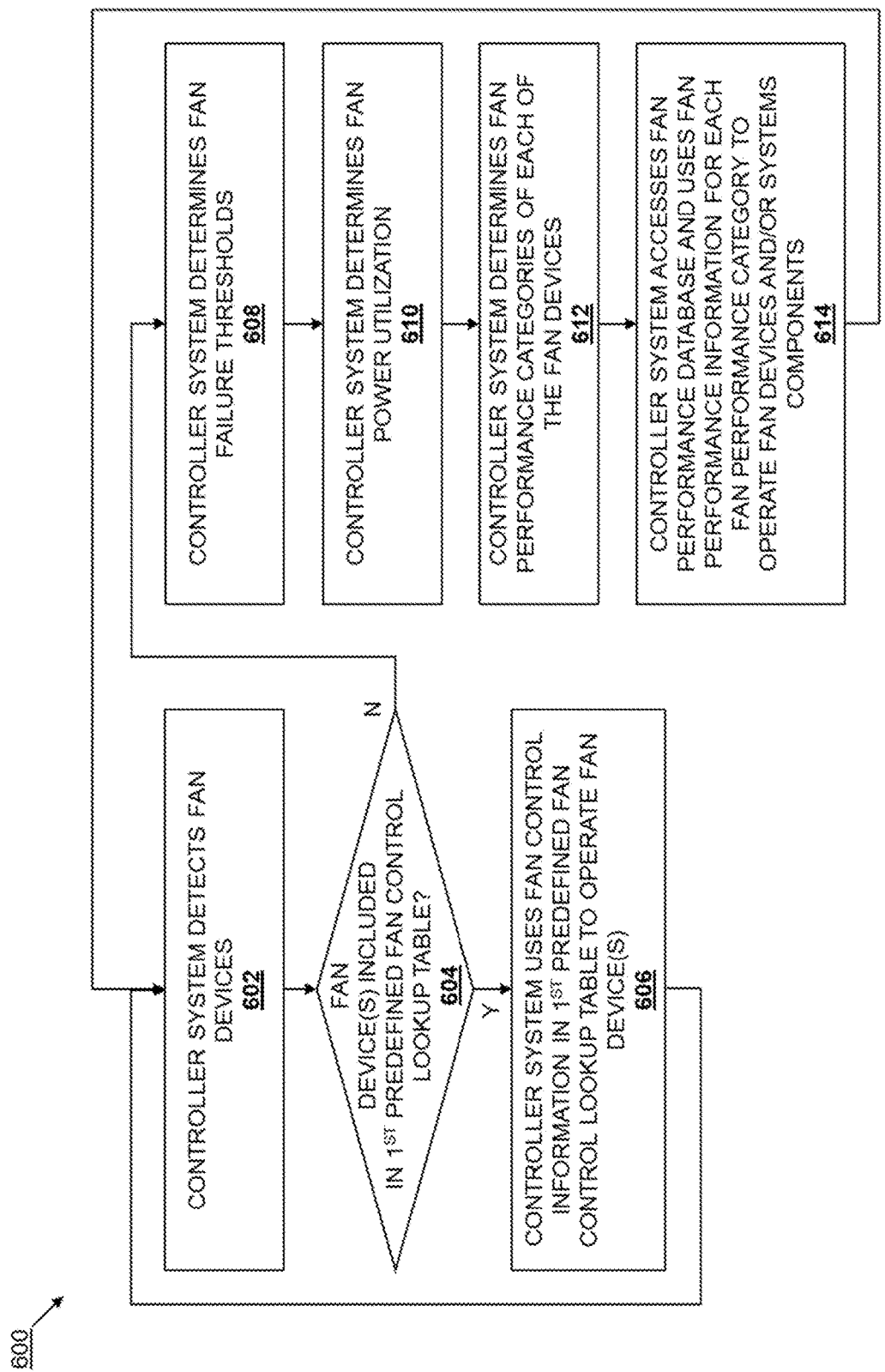
FIG. 6 is a flow chart illustrating an embodiment of a method for characterizing and controlling a fan system.

Referring now to FIG. 6, an embodiment of a method 600 for fan characterization and control is illustrated. As discussed below, the fan characterization and control systems and methods of the present disclosure enable forward compatibility of computing cooling systems (and other cooling systems) with future (e.g., yet to be designed and/or manufactured) fan devices through the combined use of fan device power characterizations, fan device failure threshold characterizations, and predefined fan performance category determinations, which alleviates the need to update firmware on the system while optimizing the operation of fan devices that may be added to the system. As such, new fan devices may be added to the system while compensating for the possible changes in cooling capabilities, as well as enabling adjustment for ambient temperature limits, power capping temperature thresholds, and open loop fan speeds so that the system may take advantage of higher performance fan devices and/or protect the system from issues resulting from the use of lower performance fan devices, all without the need to update firmware on the system when the new fan devices are added.

The method 600 begins at block 602 where a controller system detects fan devices. With reference to FIGS. 2, 3, and 5, in an embodiment, fan devices such as, for example, conventional fan devices and/or the fan devices 500 discussed above with reference to FIG. 5, may be coupled to the fan characterization and control system 200/300 by engaging connectors in the fan characterization and control system 200/300 (e.g., the connectors 310*a* discussed above with reference to FIG. 3) with fan connectors on those fan devices (e.g., the fan connectors 504 discussed above with reference to FIG. 5). As such, at block 602, a plurality of fan devices (e.g., the fan devices 216a-f discussed above with reference to FIG. 2) may be coupled to the fan characterization and control system 200/300. In response, the system control engine 304 may communicate through each of the connectors 310a coupled to the fan system 310 and detect the coupling of those fan devices to the fan characterization and control system 200/300.

The method 600 then proceeds to decision block 604 where it is determined whether any of the fan device detected at block 602 are included in a first predefined fan control lookup table. In an embodiment, the system control engine 304 may communicate with each of the fan devices detected at block 602 to identify each of those fan devices (e.g., via the identification information that may be provided by the fan devices as discussed above), and then reference the fan performance database 312 to determine whether any of those fan devices are included in the first predefined fan control lookup table. As discussed above, the first predefined fan control lookup table may include fan performance characteristics and fan control information for known fan devices that is provided from particular fan vendors of those fan devices, and that may be used in optimizing the operation of those fan devices.

If, at decision block 604, it is determined that fan device(s) are included in the first predefined fan control lookup table, the method 600 proceeds to block 606 where the controller system uses fan control information from the first predefined fan control lookup table to operate the fan device(s) included in the first predefined fan control lookup table. As discussed above, for any fan device included in the first predefined fan control lookup table, the system control engine 304 may determine cooling needs for the system and/or components in the system, and then retrieve fan control information from the first predefined fan control lookup table that will operate those fan devices at a level that will provide the needed cooling. For example, the system control engine 304 may determine that the processing component 214a needs a first level of cooling (e.g., a CFM cooling level) and that the fan device 216a is identified in the first predefined fan control lookup table. The system control engine 304 may then retrieve a PWM control signal from the first predefined fan control lookup table that is associated with the CFM cooling level that was determined for the processing component 214a, and use the PWM control signal to operate the fan device 216a to provide the CFM cooling level. Furthermore, the system control engine 304 may also adjust the level of operation of the processing component 214a, the operation of the power component 214e, and/or the operation of the fan device 216a in order to ensure the power consumed by the fan device 216a (which may be included in the first predefined fan control lookup table) does not cause a system power threshold to be exceeded, fan failure thresholds for the fan device 216a (which may be included in the first predefined fan control lookup table) are not exceeded, and/or to operate the fan device 216a according to any other desired system property. One of skill in the art in possession of the present disclosure will recognize that the system control engine 304 may take into account the operation of any or all of the other components and/or the other fan devices in a similar manner when operating the fan device(s) using fan control information from the first predefined fan control lookup table. The method 600 may then return back to block 602 where the controller system detects fan devices as discussed above.

If, at decision block 604, it is determined that fan device(s) are not included in the first predefined fan control lookup table, the method 600 proceeds to block 608 where the controller system determines fan failure thresholds. As discussed above, fan devices may be provided in the fan characterization and control system 200/300 that are not identified in the first predetermined fan control lookup tables, which may be a result of a variety of reasons including that the fan device vendor has not provided such information to the fan characteristic and control system provider, that a user of the fan characteristic and control system 200/300 has not performed a firmware update that would provide such information in the first predetermined fan control lookup tables, and/or due to a variety of other reasons known in the art. However, in some embodiments, the fan characteristic and control system 200/300 may not include the first predefined fan control lookup table, and rather may operate all fan devices added to the fan characteristic and control system 200/300 using the second predefined fan control lookup table and techniques discussed below. In some embodiments, the system control engine 304 may determine that fan devices are not included in the first predefined fan control lookup table in response to those fan devices identifying a fan performance category through one or more of the pins on their respective fan connectors, as discussed above.

In response to detecting fan device(s) that are not identified in the first predefined fan control lookup table (or if no first predefined fan control lookup table is provided), the controller system operates to perform an in-system characterization of fan failure thresholds for those fan devices. In an embodiment, at block 608, the system control engine 304 provides PWM control signals to each of the fan devices in order to operate those fan devices at one or more fan speeds. At each of those fan speeds, the system control engine 304 may retrieve fan performance characteristic information for those fan devices and store that fan performance characteristic information. For example, at each fan speed, the system control engine 304 may log fan frequency such as, for example, rotation-per-minute (RPM) data for each of the fan devices, and store that RPM data in association with the PWM control signals in the fan performance database 312. In an embodiment, the system control engine 304 may then determine whether the fan performance characteristic information generated by the fan devices falls within one or more thresholds. For example, the system control engine 304 may determine an average fan frequency such as, for example, an average RPM for the fan devices when operated as discussed above, and a standard deviation from that average RPM for fan devices that are of the same type form factor or that include other common fan characteristic known in the art. The system control engine 304 may then determine whether that standard deviation from the average RPM is within a threshold level. For example, if the standard deviation from the average RPM is not within a threshold level (e.g., within 200 RPM of the average RPM, although other standard deviations will fall within the scope of the present disclosure), that may be indicative of an issue with one or more of the fan devices and, as a result, the system control engine 304 may log a fan fault and/or provide a fan fault message to the user of the system.

Referring now to FIG. 7, if the fan performance characteristic information does not exceed any thresholds (e.g., the threshold standard deviation for the average RPM of like-type-fan devices), at block 608 the system control engine 304 may then determine fan failure thresholds using the fan performance characteristic information generated by the fan devices. FIG. 7 illustrates a fan performance graph 700 of fan control information (e.g., PWM control signals) versus fan performance characteristic information (e.g., fan RPM) that may be generated at block 608. The fan performance graph 700 includes an average RPM of like-type-fan devices line 702 that may have been generated by the operations of the system control engine 304 discussed above. In an embodiment, at block 608 the system control engine 304 may then utilize one or more predefined failure threshold offsets that it applies to the fan performance characteristic information generated by the fan devices in order to generate one or more fan failure thresholds. The fan performance graph 700 includes a first fan failure threshold line 704 that may be provided by applying a first percentage offset to the fan performance characteristic information generated by the fan devices that was used to provide the average RPM of like-type-fan devices line 702, and a second fan failure threshold line 706 that may be provided by applying a second percentage offset to the fan performance characteristic information generated by the fan devices that was used to provide the average RPM of like-type-fan devices line 702. In an embodiment, the first fan failure threshold line 704 may provide non-critical fan failure thresholds for the fan devices that generated the fan performance characteristic information, while the second fan failure threshold line 706 may provide critical fan failure thresholds for the fan devices that generated the fan performance characteristic information.

Each of the fan devices may then be assigned fan failure thresholds using information generated as discussed above. For example, like-type-fan devices that produced fan performance characteristics that were used to provide the fan performance graph 700 may be associated with the fan failure thresholds identified by the first fan failure threshold line 704 and the second fan failure threshold line 706. Similarly, other fan performance graphs may be generated to assign fan failure thresholds to other fan devices in the fan characteristic and control system 200/300 as well. In some embodiments, such fan failure thresholds may be associated with fans devices in the fan performance database 400. For example, a group of like-type-fan devices may identify themselves as CATEGORY 2 fan devices as discussed above, and fan failure thresholds for those fan devices may be stored in the performance characteristic column 406 of row 410b of the second predefined fan control lookup table 402. While a specific example of the determination of fan failure thresholds has been illustrated and described, one of skill in the art in possession of the present disclosure will recognize that a variety of other techniques may be used to provide similar fan failure thresholds while remaining within the scope of the present disclosure. Furthermore, while an example of like-type-fan devices have been discussed for the determination of fan failure thresholds due to such like-type-fan devices typically operating within some similar range, fan failure thresholds may be determined for mixed-type-fan devices if larger offsets for fan failure thresholds and reduced ability to detect fan failures are acceptable.

The method 600 then proceeds to block 610 where the controller system determines fan power utilization. For fan device(s) that are not identified in the first predefined fan control lookup table (or if no first predefined fan control lookup table is provided), at block 610 the controller system operates to perform an in-system characterization of fan power consumption for those fan devices. In an embodiment, at block 610, the system control engine 304 provides PWM control signals to each of the fan devices in order to operate those fan devices at one or more fan speeds. At each of those fan speeds, the system control engine 304 may retrieve fan power consumption information for those fan devices and store that fan power consumption information in the fan performance database 312. In an embodiment, at each fan speed, the system control engine 304 may log power consumption data for each of the fan devices, and store that power consumption data in association with the PWM control signals in the fan performance database 312. Each of the fan devices may then be associated with their power consumption information in the fan performance database 312.

The method 600 then proceeds to block 612 where the controller system determines fan performance categories for each of the fan devices. As discussed above, each of the fan devices (e.g., the fan device 500 discussed above with reference to FIG. 5) may be configured to identify to the system control engine 304 a fan performance category within which it falls (e.g., via the one or more pins 504a as discussed above). As such, the system control engine 304 may receive those identifications from each fan device at block 612, and associate each of those fan devices with one of the fan performance categories included in the fan performance database 312. Thus, following at least block 612, the system control engine 304 may have associated each of the fan devices coupled to the system with a fan performance category that is further associated with the fan performance characteristics and fan control information discussed above.

The method 600 then proceeds to block 614 where the controller system accesses the fan performance database and uses fan performance information in each fan performance category to operate the fan devices and/or system components. In an embodiment, once the each of the fan devices has been associated with a fan performance category in one of the second predefined fan control lookup tables in the fan performance database 312/400, fan failure thresholds have been generated and associated with the fan devices (e.g., in one of the second predefined fan control lookup tables in the fan performance database 312/400), and power consumption information has been associated with each of the fan devices (e.g., in the fan performance database 312/400), the system control engine 304 may operate the system components 306, the power system 308, and/or the fan system 310 using that information to provide any desired operation of the system.

For example, the system control engine 304 may consider operating instructions, power thresholds, and cooling needs for the system and/or components in the system, and then retrieve information from the second predefined fan control lookup table that is used to operate the system components 306, the power system 308, and the fan devices in the fan system 310 at one or more levels that will satisfy those operating instructions, power thresholds, and cooling needs. For example, the system control engine 304 may receive operating instructions for the system components that will cause the system components 306 to require a first level of cooling, determine fan devices that are available to provide such cooling, retrieve information from the second predefined fan control lookup tables that indicates how those fan device may be operated to provide such cooling while also not exceeding power thresholds for the power system or fan failure thresholds determined for each of the fan devices, and use that information to adjust the operation of any or all of the system components 306, the power system 308, and the fan system 310 in order to provide a desired operation of the system. As such, the system control engine 304 may be able to detect fan devices from different fan vendors, as well as different generation fans from the same fan vendors, that operate at substantially different speeds in response to similar control signals, and thus may operate each of those fan devices to provide desired cooling levels. One of skill in the art in possession of the present disclosure will recognize that the system control engine 304 may take into account the operation of fan devices operated according to the first predefined fan control lookup table as well at block 614. The method 600 may then return back to block 602 where the controller system detects fan devices as discussed above.

As such, systems and methods have been described that allow for the determination of fan performance characteristics, which are needed to consider fan-specific dependencies that are utilized in providing a desired operation of a computing system, without the need to perform firmware updates that explicitly defined those fan performance characteristics for each particular fan device that may be added to the computing system, and without the expense associated with "smart" fan devices that are configured to report such fan performance characteristics to the computing system. One of skill in the art in possession of the present disclosure will recognize that the fan performance characteristics provided by the systems and methods of the present disclosure allow for proper accounting of power in order to provide power management for the system, provide appropriate definitions of fan failure thresholds, and enable alignment of airflow delivery for open loop (e.g., fan curve) settings and ambient temperature support limits In specific embodiments, the systems and methods described above utilize predefined PWM control signal or estimated CFM cooling level lookup tables or curves with discrete hardware-detected fan performance categories of fan devices, which allows fan devices to be developed and associated with fan performance categories that match their performance characteristics. Using estimated CFM cooling levels as opposed to PWM control signals may provide benefits in scaling ambient temperature restrictions and power capping temperature thresholds in a more intuitive manner while also allowing CFM cooling level reporting capabilities (e.g., systems may then predict and define in a thermal table the relationship between the CFM cooling level and the ambient support temperatures). However, in other embodiments, an analog measurement of resistance or voltage from the one or more pins 504a on a fan device may be correlated to a PWM control signal or CFM cooling level parameter. For example, a baseline PWM control signal or CFM cooling level response curve may be defined as discussed above, and the PWM control signal parameter or CFM cooling level parameter may then be used to scale that baseline response curve (e.g., if a fan device has 20% higher airflow capabilities than baseline fan devices, a scaling factors of 0.8 could be defined that would convert a baseline fan speed to 80% of the PWM control signal for that fan device, and open loop fan requests may then be scaled down by the 0.8 factor to reduce idle fan speeds based on the additional cooling available from the fan device, while the remaining 20% cooling capacity could be used to scale up the ambient temperature and power cap temperature limits).

Furthermore, combinations of the above parameters may be utilized such as, for example, by providing discrete CFM cooling levels and PWM control signal values using the discrete hardware pin detect identification from the fan device that is taught above to index a predefined CFM cooling level/PWM control signal paired value. For example, one of those parameters could be represented through an impedance of a pin within a Direct Current (DC) domain and the other of those parameters through an impedance of a pin within an Alternating Current (AC) domain. In another example, one of those parameters could be represented through a pin-provided current biased in a first direction and the other of those parameters represented through a pin-provided current biased in a second direction that is opposite the first direction.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A fan characterization and control system, comprising:
a chassis;
a plurality of components located in the chassis;
an air mover system located in the chassis;
a controller system located in the chassis and coupled to the plurality of components and the air mover system, wherein the controller system is configured to:
  detect a plurality of air mover devices in the air mover system that are connected to the controller system via respective air mover connectors;
  determine air mover performance categories of each of the plurality of air mover devices based on signals communicated by each of the plurality of air mover devices through at least one pin on the respective air mover connectors;
  access an air mover performance database that stores a plurality of different air mover performance categories and respective air mover performance characteristics for each of the plurality of different air mover performance categories; and
  use air mover performance information that is associated in the air mover performance database with each of the air mover performance categories determined for the plurality of air mover devices to operate the plurality of components and the air mover system.

2. The system of claim 1, wherein the controller system is configured to:
determine an air mover frequency for each of the plurality of air mover devices when operated according to at least one air mover control level;
determine an average air mover frequency for the plurality of air mover devices; and
determine at least one air mover failure threshold using the average air mover frequency, wherein the at least one air mover failure threshold is used to operate the plurality of components and the air mover system.

3. The system of claim 2, wherein the controller system is configured to:
determine that a standard deviation of the air mover frequencies for the plurality air mover devices exceeds a threshold and, in response, report an air mover system fault.

4. The system of claim 2, wherein the at least one fan failure threshold is determined using at least one predefined offset that is applied to the average air mover frequency for the plurality of air mover devices.

5. The system of claim 1, wherein the controller system is configured to:
determine an air mover power consumption for each of the plurality of air mover devices when operated according to at least one air mover control level, wherein the air mover power consumption for each of the plurality of air mover devices is used to operate the plurality of components and the air mover system.

6. The system of claim 1, wherein the air mover control database stores the plurality of different air mover performance categories in association with the respective air mover performance characteristics as a continuous curve.

7. The system of claim 1, wherein the air mover control database stores the plurality of different air mover performance categories as a plurality of respective discrete performance categories associated with a respective discrete air mover performance characteristics.

8. An Information Handling System (IHS), comprising:
a non-transitory memory system storing a plurality of different fan performance categories and respective fan performance characteristics for each of the plurality of different fan performance categories; and
a processing system that is coupled to the non-transitory memory system and that is configured to execute instructions from the non-transitory memory system to provide a system control engine that is configured to:
detect a plurality of fan devices that are connected to the processing system via respective fan connectors;
determine fan performance categories of each of the plurality of fan devices based on signals communicated by each of the plurality of fan devices through at least one pin on the respective fan connectors; and
use fan performance information that is associated in the fan performance database with each of the fan performance categories determined for the plurality of fan devices to configure a plurality of components and the plurality of fan devices for operation.

9. The IHS of claim 8, wherein the system control engine is configured to:
determine a fan frequency for each of the plurality of fan devices when operated according to at least one fan control level;
determine an average fan frequency for the plurality of fan devices; and
determine at least one fan failure threshold using the average fan frequency, wherein the at least one fan failure threshold is used to configure the plurality of components and the plurality of fan devices for operation.

10. The IHS of claim 9, wherein the system control engine is configured to:
determine that a standard deviation of the fan frequencies for the plurality fan devices exceeds a threshold and, in response, report a fan system fault.

11. The IHS of claim 9, wherein the at least one fan failure threshold is determined using at least one predefined offset that is applied to the average fan frequency for the plurality of fan devices.

12. The IHS of claim 8, wherein the system control engine is configured to:
determine a fan power consumption for each of the plurality of fan devices when operated according to at least one fan control level, wherein the fan power consumption for each of the plurality of fan devices is used to configure the plurality of components and the plurality of fan devices for operation.

13. The IHS of claim 8, wherein the plurality of different fan performance categories are stored in association with the respective fan performance characteristics as a continuous curve.

14. A method for fan characterization and control, comprising:
detecting, by a controller system, a plurality of fan devices that are connected to the controller system via respective fan connectors;
determining, by the controller system, fan performance categories of each of the plurality of fan devices based on signals communicated by each of the plurality of fan devices through at least one pin on the respective fan connectors;
accessing, by the controller system, a fan performance database that stores a plurality of different fan performance categories and respective fan performance characteristics for each of the plurality of different fan performance categories; and
using, by the controller system, fan performance information that is associated in the fan performance database with each of the fan performance categories determined for the plurality of fan devices to operate the plurality of components and the plurality of fan devices.

15. The method of claim 14, further comprising:
determining, by the controller system, a fan frequency for each of the plurality of fan devices when operated according to at least one fan control level;
determining, by the controller system, an average fan frequency for the plurality of fan devices; and
determining, by the controller system, at least one fan failure threshold using the average fan frequency, wherein the at least one fan failure threshold is used to operate the plurality of components and the plurality of fan devices.

16. The method of claim 15, further comprising
determining, by the controller system, that a standard deviation of the fan frequencies for the plurality fan devices exceeds a threshold and, in response, report a fan system fault.

17. The method of claim 15, wherein the at least one fan failure threshold is determined using at least one predefined offset that is applied to the average fan frequency for the plurality of fan devices.

18. The method of claim 14, further comprising:
determining, by the controller system, a fan power consumption for each of the plurality of fan devices when operated according to at least one fan control level, wherein the fan power consumption for each of the plurality of fan devices is used to operate the plurality of components and the plurality of fan devices.

19. The method of claim 14, wherein the fan control database stores the plurality of different fan performance categories in association with the respective fan performance characteristics as a continuous curve.

20. The method of claim 14, wherein the fan control database stores the plurality of different fan performance categories as a plurality of respective discrete performance categories associated with a respective discrete fan performance characteristics.

* * * * *